US010526022B2

(12) United States Patent
Gonda

(10) Patent No.: US 10,526,022 B2
(45) Date of Patent: Jan. 7, 2020

(54) MOTOR VEHICLE WITH A RECEIVING ELEMENT FOR A TORSION BAR

(71) Applicant: Bayerische Motoren Werke Aktiengesellschaft, Munich (DE)

(72) Inventor: Mihaly Gonda, Unterschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/859,826

(22) Filed: Jan. 2, 2018

(65) Prior Publication Data

US 2018/0118278 A1 May 3, 2018

Related U.S. Application Data

(63) Continuation of application No. PCT/EP2016/064905, filed on Jun. 28, 2016.

(30) Foreign Application Priority Data

Jul. 3, 2015 (DE) .......................... 10 2015 212 463

(51) Int. Cl.
*B62D 27/06* (2006.01)
*B62D 25/20* (2006.01)
*B62D 29/00* (2006.01)

(52) U.S. Cl.
CPC ........... *B62D 27/065* (2013.01); *B62D 25/20* (2013.01); *B62D 29/008* (2013.01)

(58) Field of Classification Search
CPC ................................................... B62D 27/065
See application file for complete search history.

(56) References Cited

U.S. PATENT DOCUMENTS

| 5,337,997 A * | 8/1994 | Hockney .................. B60G 7/02 248/596 |
| 5,897,139 A * | 4/1999 | Aloe ........................ B60G 7/02 280/781 |
| 7,549,660 B2 | 6/2009 | Ramsey et al. |
| 2005/0134095 A1 | 6/2005 | Mayer et al. |
| 2010/0072724 A1* | 3/2010 | Toepker ................. B21D 53/88 280/124.106 |
| 2013/0300158 A1 | 11/2013 | Andree et al. |

FOREIGN PATENT DOCUMENTS

| DE | 102 56 130 A1 | 6/2004 |
| DE | 10 2011 009 442 A1 | 7/2012 |
| DE | 10 2013 002 365 B3 | 1/2014 |

(Continued)

OTHER PUBLICATIONS

Machine translation of JP '114 from PAJ (j-platpat website): (Year: 1997).*

(Continued)

*Primary Examiner* — Hilary L Gutman
(74) *Attorney, Agent, or Firm* — Crowell & Moring LLP

(57) ABSTRACT

A motor vehicle has a receiving element for a torsion bar. In order to devise a motor vehicle which has a receiving element for a torsion bar and in which the receiving element has a simple design and reduced weight while avoiding drawbacks in respect of the sealing effect and the available space, the receiving element consists essentially of a monolithic extruded profile.

9 Claims, 2 Drawing Sheets

(56) References Cited

FOREIGN PATENT DOCUMENTS

| EP | 0930183 A1 | * | 7/1999 | ........... B60G 13/001 |
| EP | 1 721 762 A1 | | 11/2006 | |
| EP | 1721762 A1 | * | 11/2006 | ............... B60G 7/02 |
| EP | 1970225 A1 | * | 9/2008 | ............... B60G 7/02 |
| EP | 2 030 870 B1 | | 9/2010 | |
| EP | 2 248 712 A1 | | 11/2010 | |
| FR | 2 838 376 A1 | | 10/2003 | |
| JP | 09095114 A | * | 4/1997 | ........... B60G 21/052 |
| WO | WO-2010131949 A1 | * | 11/2010 | ............... B60G 7/02 |
| WO | WO-2012123680 A1 | * | 9/2012 | ............... B60G 7/02 |

OTHER PUBLICATIONS

International Search Report (PCT/ISA/210) issued in PCT Application No. PCT/EP2016/064905 dated Sep. 15, 2016 with English translation (seven pages).
German-language Search Report issued in counterpart German Application No. 10 2015 212 463.0 dated May 19, 2016 with partial English translation (13 pages).
English translation of Chinese-language Office Action issued in counterpart Chinese Application No. 201680038077.5 dated Jul. 2, 2019 (seven (7) pages).

* cited by examiner

MOTOR VEHICLE WITH A RECEIVING ELEMENT FOR A TORSION BAR

CROSS REFERENCE TO RELATED APPLICATIONS

This application is a continuation of PCT International Application No. PCT/EP2016/064905, filed Jun. 28, 2016, which claims priority under 35 U.S.C. § 119 from German Patent Application No. 10 2015 212 463.0, filed Jul. 3, 2015, the entire disclosures of which are herein expressly incorporated by reference.

BACKGROUND AND SUMMARY OF THE INVENTION

The invention relates to a motor vehicle with a receiving element for a torsion bar.

The connecting of a torsion bar to the chassis of a motor vehicle usually occurs by a multi-piece receiving element, which is produced in a steel shell design. The receiving element consists of, for example, a front piece (drawing and/or folding part), a rear piece (drawing and/or folding part), and a receiving element for the torsion bar as a tube part (which in itself is already costly) or as a component with press or welded nuts. These components are firmly joined together and connected to the receiving element, which in turn is firmly connected to the chassis.

The connection of the components to each other and to the chassis can be done for example by welding (spot welding, inert gas welding, or the like), screwing, or bonding. This is expensive and results in increased costs for the bodywork. Furthermore, on account of the welding and bonding standards, the available design space cannot be optimally utilized.

Furthermore, sealing work needs to be done on the receiving element consisting of several individual pieces. The sealing may be done, for example, by a rust prevention of the cavity and/or a seam sealing. If the receiving element is located in the proximity of the exhaust gas system, the heat of the exhaust gas system may be detrimental to the seal. In order to prevent this, either a larger distance from the exhaust gas system must be observed or a thermal protection measure must be taken, which has a negative impact on the costs and the vehicle weight. Both steps impair the function, since the receiving element needs to be made smaller at the installation side in order to carry out the necessary protection measures.

Since the receiving element is firmly joined to the chassis, it is also necessary for cost reasons that all vehicles of a model series be outfitted with communal bodywork with the receiving element, which further increases the weight of the individual motor vehicle. This could only be avoided by a specific routing of the car bodies during the chassis construction, which in turn involves high added costs, however.

Therefore, the problem which the present invention proposes to solve is to create a motor vehicle with a receiving element for a torsion bar in which the receiving element has a simple design and reduced weight, and in which the drawbacks with regard to sealing and available space are eliminated.

This problem is solved in a motor vehicle with a receiving element for a torsion bar according to the invention in that the receiving element consists of a monolithic extruded profile. If the die for the extruded profile becomes too large for the monolithic design, in order to obtain the cost benefits in regard to the piece count, the receiving element of the torsion bar can be welded together from two or three extruded profiles. Thanks to the symmetry effects, a three-piece component for example can be fabricated with only two dies. The benefits in regard to eliminating the sealing and thermal protection work remain in place.

Thanks to the configuration of the receiving element as an extruded profile, the receiving element is lighter than the former receiving element of a steel shell design. Furthermore, sealing work in the region of the receiving element can be eliminated, so that no structural space needs to be reserved for thermal protection work, which leads to a better utilization of the structural space. Furthermore, a cost reduction is achieved due to the elimination of the thermal protection and sealing work. In addition, the aerodynamics of the motor vehicle can also be improved by the configuration of the receiving element as an extruded profile.

According to one advantageous embodiment, the receiving element has a substantially trapezoidal cross-section. Such a cross section is relatively easy to make by extrusion.

Advantageously, the receiving element is bolted to the motor vehicle. In this way, vehicles not requiring the installation of a torsion bar are not needlessly burdened with the weight of the receiving element, since the receiving element does not need to be permanently installed already during the fabrication of the chassis, but instead can be bolted onto the chassis even afterwards, if needed.

According to one preferred embodiment, the bolting is done directly to the chassis. This has only minimal impact on the structural space and also produces only slight restrictions with regard to function. Furthermore, an additional reduction of joining work and thus a cost reduction in the chassis construction are achieved.

According to a preferred alternative embodiment, the bolting may also be done by at least one bolting adapter firmly joined to the motor vehicle. Thanks to this installation concept, only small bolting adapters are required, so that only minimal impact on the available space and also only minimal restrictions in terms of function need to be accepted with this design variant as well. The bolting adapter may also be designed "wet", so that the sealing work can be further reduced.

The trapezoidal receiving element according to one advantageous modification is bolted to the motor vehicle or to the bolting adapter on its longer base side and bolted to the torsion bar on its opposite, shorter base side.

According to a further advantageous embodiment, the receiving element is provided with flanges for receiving the bolting, which flanges protrude at the side beyond the longer base side of the trapezoidal receiving element.

Advantageously, two bolting adapters are provided, being firmly joined to the motor vehicle and arranged at a spacing from each other. In this way, a further cost reduction can be achieved, since the bolting adapters can be designed relatively small.

The mutual spacing of the two bolting adapters advantageously corresponds substantially to the length of the longer base side of the trapezoidal receiving element including the two flanges.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
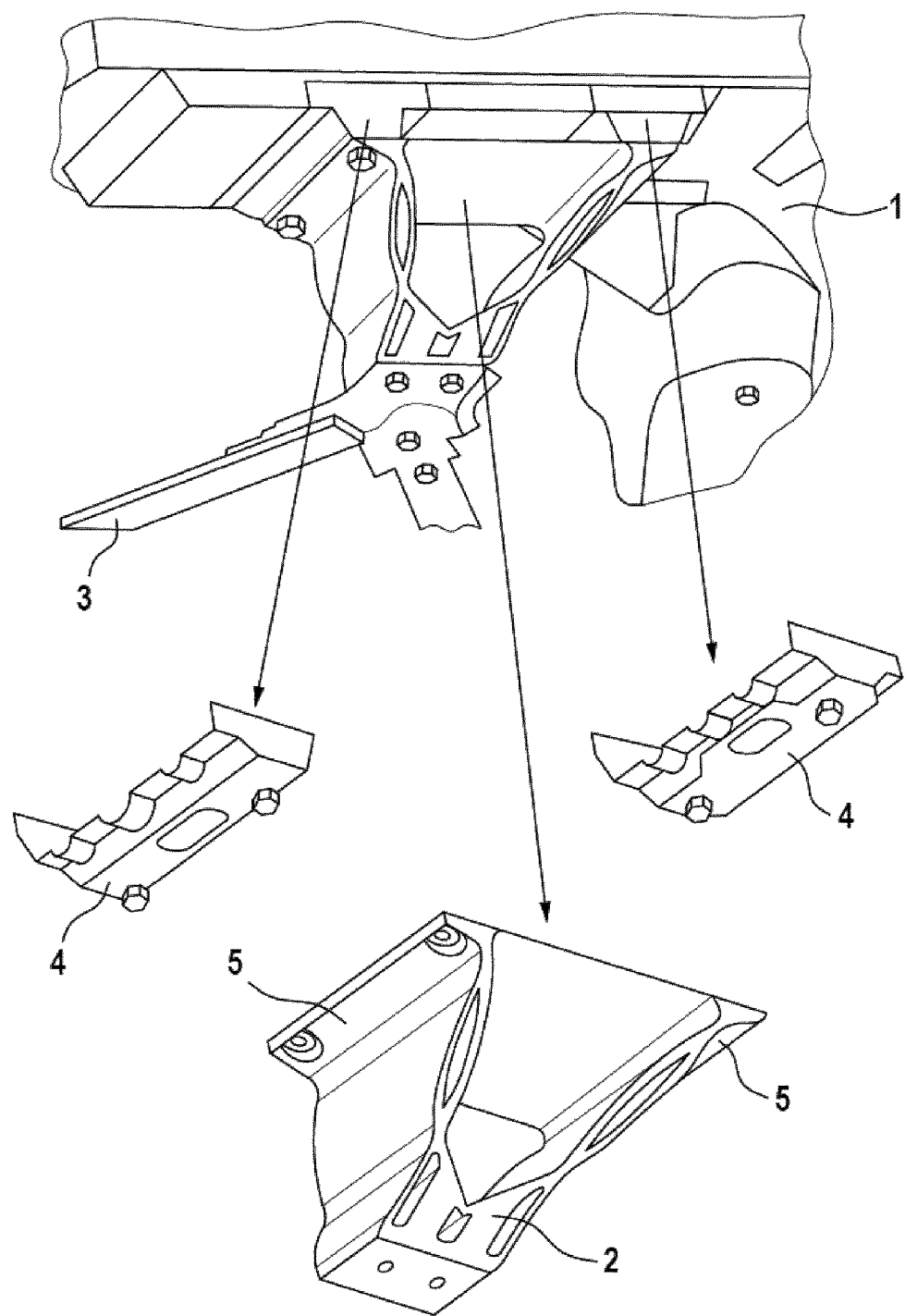
FIG. 1 is a schematic view of a motor vehicle according to the invention in the region of the receiving element for a torsion bar in the assembled state (top) and in an exploded view (bottom).

FIG. 1 represents a motor vehicle 1 only to the extent needed in the present case. A receiving element 2 for a torsion bar 3 is arranged on the motor vehicle.

The receiving element 2 is a monolithic extruded profile with a substantially trapezoidal cross section.

The receiving element 2 is bolted to the motor vehicle 1, and this is done either directly (not shown) or indirectly via two bolting adapters 4 joined firmly to the motor vehicle 1 and arranged at a spacing from each other.

Unlike what is shown, it is also possible to provide only a single bolting adapter of appropriate size.

The trapezoidal receiving element 2 is bolted to the motor vehicle 1 or to the bolting adapters 4 on its longer base side and to the torsion bar 3 on its opposite, shorter base side.

In order to receive the bolts, the receiving element 2 is provided with flanges 5, which flanges extend laterally outward beyond the longer base side of the trapezoidal receiving element 2.

The spacing of the two bolting adapters 4 from each other is chosen such that it corresponds substantially to the length of the longer base side of the trapezoidal receiving element 2 including the two flanges 5, as can be seen from FIG. 1.

Figure 2:
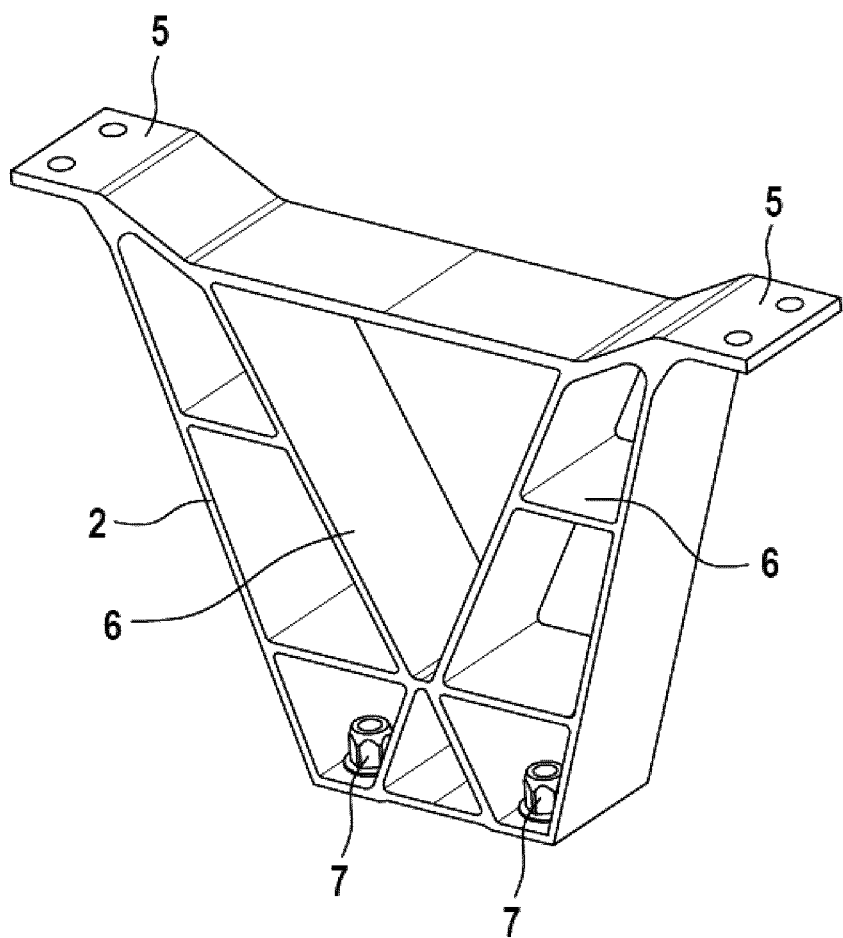
FIG. 2 is a schematic view of another embodiment of the receiving element for a torsion bar according to the invention.

FIG. 2 shows another embodiment of the trapezoidal receiving element 2.

This receiving element 2 is provided, in addition, with stiffening ribs 6 within its trapezoidal contour. As in the embodiment of FIG. 1, this receiving element 2 is also bolted to the motor vehicle 1 or to the bolting adapters 4 at its longer base side. At its opposite, shorter base side, the receiving element is connected to the torsion bar 3, e.g., by means of blind rivet nuts 7.

In this embodiment as well, the receiving element 2 is provided with flanges 5 to receive the bolts, which flanges extend laterally outward beyond the longer base side of the trapezoidal receiving element 2.

LIST OF REFERENCE SYMBOLS 1 motor vehicle
2 receiving element
3 torsion bar
4 bolting adapter
5 flange
6 stiffening ribs
7 blind rivet nut The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
a torsion bar; and
a receiving element via which the torsion bar is connected to the motor vehicle, wherein
the receiving element consists essentially of a monolithic extruded profile,
the receiving element has a substantially trapezoidal cross-section,
the receiving element is bolted to the motor vehicle on a longer base side of the substantially trapezoidal cross-section and bolted to the torsion bar on a shorter base side of the substantially trapezoidal cross-section that is an opposite side of the longer base side, and
the shorter base side is a bottom surface of the receiving element.

2. The motor vehicle as claimed in claim 1, wherein the receiving element is directly bolted to the motor vehicle.

3. The motor vehicle as claimed in claim 1, further comprising:
at least one bolting adapter firmly joined to the motor vehicle, wherein
the receiving element is bolted to the motor vehicle via the at least one bolting adapter.

4. The motor vehicle as claimed in claim 3, wherein the receiving element is bolted to the motor vehicle via the at least one bolting adapter on the longer base side and bolted to the torsion bar on the shorter base side.

5. The motor vehicle as claimed in claim 1, wherein the receiving element is provided with flanges for receiving bolts, which flanges extend laterally outward beyond the longer base side of the receiving element.

6. The motor vehicle as claimed in claim 3, wherein the receiving element is provided with flanges for receiving bolts, which flanges extend laterally outward beyond the longer base side of the receiving element.

7. The motor vehicle as claimed in claim 1, further comprising:
two bolting adapters firmly joined to the motor vehicle and arranged at a spacing from one another, wherein
the receiving element is bolted to the motor vehicle by the two bolting adapters.

8. The motor vehicle as claimed in claim 5, further comprising:
two bolting adapters firmly joined to the motor vehicle and arranged at a spacing from one another, wherein
the receiving element is bolted to the motor vehicle by the two bolting adapters.

9. The motor vehicle as claimed in claim 8, wherein the spacing of the two bolting adapters corresponds substantially to a length of the longer base side of the receiving element including the flanges.

* * * * *